United States Patent
Roland et al.

(10) Patent No.: US 7,963,538 B2
(45) Date of Patent: Jun. 21, 2011

(54) WHEEL SUSPENSION ASSEMBLY AND A MOTOR VEHICLE

(75) Inventors: Magnus Roland, Vänersborg (SE); Gunnar Burénius, Österås (NO)

(73) Assignee: Swedish Advanced Automotive Business AB, Vanersborg (SE)

( * ) Notice: Subject to any disclaimer, the term of this patent is extended or adjusted under 35 U.S.C. 154(b) by 0 days.

(21) Appl. No.: 12/513,451

(22) PCT Filed: Nov. 1, 2007

(86) PCT No.: PCT/EP2007/061803
§ 371 (c)(1),
(2), (4) Date: Jan. 29, 2010

(87) PCT Pub. No.: WO2008/053034
PCT Pub. Date: May 8, 2008

(65) Prior Publication Data
US 2010/0133775 A1 Jun. 3, 2010

(30) Foreign Application Priority Data
Nov. 3, 2006 (SE) .................... 0602335

(51) Int. Cl.
*B60G 3/18* (2006.01)
(52) U.S. Cl. ............................. 280/124.138
(58) Field of Classification Search ........... 280/124.135, 280/124.136, 124.138, 124.139, 124.142, 280/124.143; 180/337, 341
See application file for complete search history.

(56) References Cited

U.S. PATENT DOCUMENTS

| | | | |
|---|---|---|---|
| 4,930,804 A | 6/1990 | Tattermusch et al. | |
| 5,048,860 A * | 9/1991 | Kanai et al. | 280/86.757 |
| 5,094,473 A | 3/1992 | Kawabe et al. | |
| 5,114,175 A | 5/1992 | Sakai | |
| 5,421,606 A | 6/1995 | Chun | |
| 5,507,510 A | 4/1996 | Kami et al. | |
| 5,851,016 A | 12/1998 | Kawagoe et al. | |

(Continued)

FOREIGN PATENT DOCUMENTS
EP         0316711 A         5/1989
(Continued)

OTHER PUBLICATIONS

PCT/IS/210—International Search Report—Feb. 8, 2008.
PCT/IPEA/409—International Preliminary Report on Patentability—Feb. 10, 2009.
Thomas Schrullkamp, Chassis systems in the field of NVH and ride and handling performance:, 2005; 3 pages.

*Primary Examiner* — Faye M. Fleming
(74) *Attorney, Agent, or Firm* — Venable LLP; Eric J. Franklin

(57) ABSTRACT

A motor vehicle and wheel suspension assembly for a rear wheel of a motor vehicle. The assembly includes a wheel spindle housing supporting a wheel spindle carrying the rear wheel and defining a wheel center. A frame structure is adapted to be connected to a vehicle body or an engine-transmission assembly of the motor vehicle. A spring link extends between the frame structure and the wheel spindle housing and carries a vehicle spring. First and second control links extend between the frame structure and the wheel spindle housing to control the wheel spindle housing to maintain the rear wheel substantially in parallel with a longitudinal direction. A first and second camber link extends between the frame structure and the wheel spindle housing, and intersect each other. An instantaneous center of motion is located at a position far outside the wheel and then rearward the wheel, or far inside the wheel and then forward the wheel.

22 Claims, 6 Drawing Sheets

U.S. PATENT DOCUMENTS

| | | | | |
|---|---|---|---|---|
| 6,719,314 | B1 * | 4/2004 | Schote | 280/124.135 |
| 6,752,409 | B1 * | 6/2004 | Kunert | 280/124.138 |
| 7,258,355 | B2 * | 8/2007 | Amano | 280/124.134 |
| 7,281,716 | B2 * | 10/2007 | Fanson | 280/5.52 |
| 2004/0140641 | A1 | 7/2004 | Eppelein | |
| 2009/0160154 | A1 * | 6/2009 | Frasch et al. | 280/124.143 |

FOREIGN PATENT DOCUMENTS

| | | |
|---|---|---|
| GB | 1285047 A | 8/1972 |
| GB | 2089743 A | 6/1982 |

* cited by examiner

WHEEL SUSPENSION ASSEMBLY AND A MOTOR VEHICLE

CROSS-REFERENCE TO RELATED APPLICATIONS

This application claims priority to Swedish patent application 0602335-2 filed 3 Nov. 2006 and is the national phase under 35 U.S.C. §371 of PCT/EP2007/061803 filed 1 Nov. 2007.

FIELD OF THE INVENTION

The present invention refers generally to the suspension of a rear wheel of a motor vehicle, especially passenger cars, sport utilities (SUVs) and light trucks. More specifically, the present invention refers to a wheel suspension assembly. The present invention also refers to a motor vehicle having a wheel suspension assembly.

BACKGROUND OF THE INVENTION AND RELATED ART

The wheel suspension assembly for a motor vehicle connects the architecture of the sprung vehicle mass to the architecture of the non-sprung and rotating tire-wheel assembly. Furthermore, the wheel suspension assembly controls the motion pattern of the tire-wheel assembly with respect to the external impact from the road as well as to the internal impact from the propelling, braking and steering as initiated by the driver through the engine-transmission assembly, the braking system, the steering system and the wheel suspension assemblies.

The overall controllability in terms of steering, propelling and braking of the vehicle is closely related to the motion pattern of the four tire-wheel assemblies. The motion of the four tire-wheel assemblies are independently controlled by the respective wheel suspension. The four tire-wheel assemblies constitute the un-sprung mass connected to the vehicle's sprung mass to which the driver is connected. During the vehicle's motion of combined forward running (surge), bounce, sway/veer, roll, pitch and yaw, these motion patterns and their time derivatives in all directions should be controlled such that a normal driver's capability of control enables the entire synthesized vehicle motion pattern to be fully controlled in a secure manner. To be noted is the fact that useful control signals and disturbing noise are superimposed and in addition to this, the objectively measurable disturbing noise frequently overpowers the useful control signal.

Vehicles are complex systems with human beings in the control loop. Although the dynamic behavior of vehicles in a response to drivers' input may be simulated or measured, this understanding does not determine the issue of 'good handling' unless complemented with the understanding of how human beings work as control systems and how a driver's brain works in vehicle control.

It is therefore important to provide a system mechanization with a synthesized operation of the communication loop defined as "fail operate, fail operate, fail safe" normally used in safety critical systems such as controlled configured airplanes. This requires a communication loop of quadruple redundancy and a dissimilar back up system, where the command media in our case is the entire vehicle-suspension architecture. The redundancy in the command media is here to be seen as flows of information of superimposed layers of power spectra where the driver's sensor.' system has capability to sense concurrently ongoing motion patterns in a similar way as our eye concurrently can perceive several colors or our ears concurrently can perceive several tones in music.

U.S. Pat. No. 5,421,606, discloses a wheel suspension assembly for the suspension of a steerable front wheel of a motor vehicle. This known wheel suspension assembly comprises a wheel spindle housing, supporting a wheel spindle on which the front wheel is mountable, and a frame structure connected to the vehicle body. A spring link extends between and connects the frame structure and the wheel spindle housing. The spring link carries a vehicle spring. A first upper control arm link extends between and connects the frame structure and the wheel spindle housing. A second upper control arm link extends between and connects the frame structure and the wheel spindle housing. The first upper control arm link and the second upper control arm link intersect each other seen in the vertical direction.

EP-A-316 711 discloses a wheel suspension comprising a frame structure, a wheel spindle housing, a spring link, a first control link, a second control link, a first camber link and a second camber link. The purpose of the wheel suspension is to improve the stiffness. The higher stiffness is achieved by means of the shown configuration including the intersecting two upper camber links. The links form a lower triangular link having a lower swing axis and an upper triangular link having an upper swing axis, wherein the swing axes form a relatively large angle with each other.

SUMMARY OF THE INVENTION

The object of the present invention is to provide an improved wheel suspension for a motor vehicle. More precisely, the object of the present invention is to provide a rear wheel suspension, which aims for maximized traction. Still more precisely, the object of the present invention is to provide a homogeneous contact pressure between the wheel, i.e. the tire, and the road. In addition, it is an object of the present invention to provide a vehicle, which aims for maximized human compatible control for normal as well as for critical unexpected events.

A further object of the present invention is to provide a wheel suspension assembly permitting control of the structural bonding of the tire to road interaction and to control the different cross coupled inertia systems, which the vehicle is composed of.

A further object of the present invention is to meet a set of functions to maximize traction power at every particular driving condition and to maximize the compatibility to human capability to control the interaction between driver, vehicle and road at the limit of adhesion when the reciprocation of dipole bonding, as an extended view of Van der Waals forces, changes between structural intermolecular bonding and loss of this structural intermolecular bonding.

A further object of the present invention is to meet a set of functions to maximize traction power at every particular driving condition and to maximize the compatibility to human capability to control the interaction between driver, vehicle and road for driving conditions when sprung body inertia has an impact on the driver vehicle control loop as impacted by the means of cross coupled roll and yaw motion.

These and further objects are achieved by the wheel suspension assembly initially defined, which is characterized in that the instantaneous center of motion is located at a position far outside the wheel and then in the rear of the wheel spindle, or far inside the wheel and then in front of the wheel.

It has been proved that a configuration with intersecting camber links will contribute to an improved traction thanks to a wheel suspension assembly securing a more homogeneous contact pressure between the wheel, i.e. the tire, and the road during various driving conditions. The structural bonding between the tire and the road will be enhanced ensuring a high traction power at every driving condition. In cases when the vehicle performance demanded by the driver cannot be supported by the structural bonding, this loss of traction will be moderated to a behavior compatible with driver control capability.

The motion of the wheel spindle housing as defined by the topology of the suspension links has an instantaneous center of motion located at a position far outside the wheel and then in the rear of the wheel spindle or at a position far inside the wheel and then in front of the wheel spindle. This motion as a springing motion of the wheel and tire as defined by the wheel spindle housing relative motion to the body as defined by desired kinematics has a superimposed motion of rotation in the plane of the wheel and tire around the wheel spindle as a result of the longitudinal motion relative to the road. The choice of topology and instantaneous center of motion is such that these superimposed motions will coincide such that the tire to road contact will be given a homogeneous distribution of the stresses so as to maximize structural bonding and tire to road traction. Furthermore, the topology permits consideration to the requirements of a camber variation during driving through curves, which are the as during straight driving and which thus has to be compensated for by a toe variation, which is what was mentioned above as the relative to the body desired kinematics.

According to an embodiment of the invention, a drive joint center of the wheel is located at a lateral distance from the frame structure along a lateral direction being perpendicular to the vertical direction and the longitudinal direction and wherein the instantaneous center of motion is located at a distance from the drive joint center that is significantly longer than said lateral distance.

According to a further embodiment of the invention, the topology of the first and second camber links and the first control link and the spring link together provide a king pin axis having a king pin location and a king pin inclination relative to the drive joint center so as to provide an action of controlling the wheel spindle housing in such a manner that the tire-wheel assembly is substantially parallel with the longitudinal direction when propelling moments and forces are applied.

It is to be noted that the wheel suspension assembly according to the invention is suitable for vehicles, where the frame structure is connected to the vehicle body, e.g. vehicles having the engine at the front of the vehicle, and for vehicles, where the frame structure is directly connected to the engine-transmission assembly, e.g. vehicles having the engine and transmission at a position rear of the driver's location.

According to a further embodiment of the invention, the first camber link and the second camber link intersect each other seen in the longitudinal direction. It has been proved that also this configuration contributes to a wheel suspension assembly securing a more homogeneous contact and a better structural bonding between the tire and the road.

According to a further embodiment of the invention, the first camber link is connected to the frame structure at a first camber frame position and the second camber link is connected to the frame structure at a second camber frame position, wherein the first camber frame position is located at a more forward position than the second camber frame position along the longitudinal direction with respect to the normal driving direction. Still further, the first camber frame position may be located at a higher position than the second camber frame position along the vertical direction. This feature may also enable controlling the motion of the wheel center in the longitudinal direction in the rearward direction when the wheel spindle housing is moving upwards in the vertical direction.

According to a further embodiment of the invention, the first camber link is connected to the wheel spindle housing at a first camber housing position and the second camber link is connected to the wheel spindle housing at a second camber housing position, wherein the first camber housing position and the second camber housing position both are located above the wheel center with the respect to the vertical direction. In addition, the first camber link and the second camber link both may be located above the wheel spindle with respect to the vertical direction. Consequently, the first camber link will form a so-called first upper camber link, and the second camber link will form a second upper camber link. The first camber housing position and the second camber housing position, along the longitudinal direction and the lateral direction, may enable controlling the motion of the rear wheel to be substantially parallel with the longitudinal direction when forward propelling forces are applied as well as when rearward braking forces are applied.

According to a further embodiment of the invention, the vehicle spring is connected to the spring link at a spring link position which is located rearwards the wheel spindle to be supported by the wheel spindle housing along the longitudinal direction with respect to the normal driving direction. Furthermore, the spring link may be connected to the wheel spindle housing at a spring link housing position and to the frame structure at a spring frame housing position, wherein the spring link housing position and the spring link frame position both are located below the wheel center with respect to the vertical direction.

According to a further embodiment of the invention, the wheel assembly comprises a shock absorber which is attached to the wheel spindle housing via a shock absorber attachment. Advantageously, the shock absorber attachment may be provided at a position which is located at a distance from the vehicle spring and forwards the wheel spindle to be supported by the wheel spindle housing along the longitudinal direction with respect to the normal driving direction. This configuration contributes to meet a fast impact from the road, where the hydraulic characteristics of the shock absorber will generate a significant resistance by means of enabling the first and second camber links to go from a preloaded condition during normal driving into a less loaded condition in the moment of road obstacle impact to the tire-wheel assembly, which effect will provide lowest possible structure borne noise from the suspension into the vehicle body from the principle of destructive interference.

According to a further embodiment of the invention, the first control link is operable to provide a super-ordinate function of controlling the motion of the wheel center in a longitudinal direction being perpendicular to a lateral direction and the vertical direction, and a sub-ordinate function of controlling the wheel spindle housing in such a manner that the rear wheel is substantially parallel with the longitudinal direction. More specifically, the super-ordinate function of the first control link may also comprise controlling the motion of the wheel center in the longitudinal direction in the rearward direction when the wheel spindle housing is moving upwards in the vertical direction. Furthermore, the second control link may advantageously be operable to provide a super-ordinate function of controlling the wheel spindle housing in such a manner that the rear wheel is substantially parallel with the longitudinal direction.

According to a further embodiment of the invention, the first control link and the second control link intersect each other seen in the vertical direction. The object of the topology of the control links, the camber links and the spring link, is to provide an instantaneous center of motion pattern of the tire-wheel assembly as defined by the topology of the wheel suspension to coincide with the instantaneous center of motion for the motion pattern of the wheel spindle housing and the tire-wheel assembly as defined by the topology of the suspension assembly as connected to the vehicle body and thus defined in a body fixed coordinate system to coincide with the instantaneous center of motion for the around the wheel spindle rotating tire-wheel assembly with a road contact defined as Homogeneous Contact Compression Interaction, where the tire-to-road contact is defined in a road fixed coordinate system. This instantaneous center of motion is thus as mentioned above located at a position far outside the wheel and then in rear of the wheel spindle or at a position far inside the wheel and then in front of the wheel spindle. This topology is advantageous to meet the aspiration of a homogeneously distributed shear force pattern, which enables maximizing structural bonding over the entire tire contact patch during the extremely short time of duration of Van der Waals forces.

According to a further embodiment of the invention, the first control link and the second control link both extend below the wheel spindle with respect to the vertical direction. This configuration contributes to lowest possible elasticity in the lateral direction from taking lateral loads as close as possible to the contact between the tire and the road with lowest possible chain of elasticity in the suspension assembly.

According to a further embodiment of the invention, the first control link is connected to the frame structure at a first control link frame position and the second control link is connected to the frame structure at a second control link frame position, wherein the first control link is connected to the wheel spindle housing at a first control link housing position and the second control link is connected to the wheel spindle housing at a second control link housing position. Advantageously, the first control link frame position and the second control link frame position may be located forwards the wheel center. Furthermore, the first control link housing position and the second control link housing position both may be located below the wheel center with respect to the vertical direction. Still further, the first control link frame position may be located at a more forward position than the second control link frame position along the longitudinal direction with respect to the normal driving direction, and the first control link housing position may be located at a more rearward position than the second control link housing position along the longitudinal direction.

According to a further embodiment of the invention, the first control link housing position and the second control link housing position both are located forwards the wheel center with respect to the longitudinal direction, however, the first control link could also extend to a first control link housing position straight beneath or substantially straight beneath the wheel center and the drive joint center.

According to a further embodiment of the invention, the first control link and the spring link together form a virtual lower triangular link swingable about a lower swing axis, wherein the first camber link and the second camber link together form a virtual upper triangular link swingable about an upper swing axis, and wherein the upper swing axis and the lower swing axis are approximately parallel with each other.

The topology of the spring link, the first and second control links and the first and second camber links provides a king pin location and inclination such that the drive joint center will be located outboard the king pin axis where the king pin axis is the instantaneous axis at each moment around which the wheel spindle housing rotates as a result of the motion pattern given by the topology of the five interdependent links.

The torque (Nm) pulsation (1/s) as the propelling power (Nm/s) pulsation could provide what is normally called torque-steer. This effect is for each left and right side caused by the propelling power pulsation from the drive shaft as giving an action-reaction effect such that the tire to road contact will give forces in the forward direction on the tire-wheel assembly and the links in the wheel spindle housing position will give forces in the rearward direction on the tire-wheel assembly. This action-reaction effect for suspensions with no elasticity in the links give a tendency towards toe-in, which effect can be minimized or even reversed towards toe-out by choice of topology and elastokinematics. The object of the approach in this invention is to balance the forward propelling power pulsation from the engine through the transmission to the drive shaft, the drive joint over the wheel spindle over the tire-wheel assembly to the road such that the above mentioned toe effects from the suspension topology and elastokinematics will be balanced by a toe effect, which is generated from the applied torque at throttle, where this torque will go over a drive-joint, which at applied torque with a forward propelling force from the drive shaft over to the wheel bearing will have a reactive force from the wheel bearing to the drive shaft such that the center of the drive shaft, which is flexible to steer in any direction will turn the wheel spindle housing and the tire-wheel assembly towards desired counter acting toe from the freedom of choice of imaginary instantaneous center of upper camber links defining the king pin axis offset, the king pin axis angle and the imaginary instantaneous axis for king pin location relative to the center of the drive joint in order to generate maximized homogeneous "traction power" from "destructive interference"

Due to the configuration that the spring link position is located rearwards the wheel spindle as mentioned above, the forwards directed control link is permitted to go from a preloaded condition during normal driving into a less loaded condition in the moment of road impact to the tire-wheel assembly, which effect will provide lowest possible structure borne noise from the suspension into the vehicle body from the principle of destructive interference.

The object is also achieved by the motor vehicle initially defined, which is characterized in that the instantaneous center of motion is located at a position far outside the wheel and then in the rear of the wheel spindle, or far inside the wheel and then in front of the wheel spindle.

BRIEF DESCRIPTION OF THE DRAWINGS

The invention is now to be explained more closely by means of the description of various embodiments, given only by way of example, and with reference to the drawings attached hereto.

DETAILED DESCRIPTION OF VARIOUS EMBODIMENTS OF THE INVENTION

Figure 1:
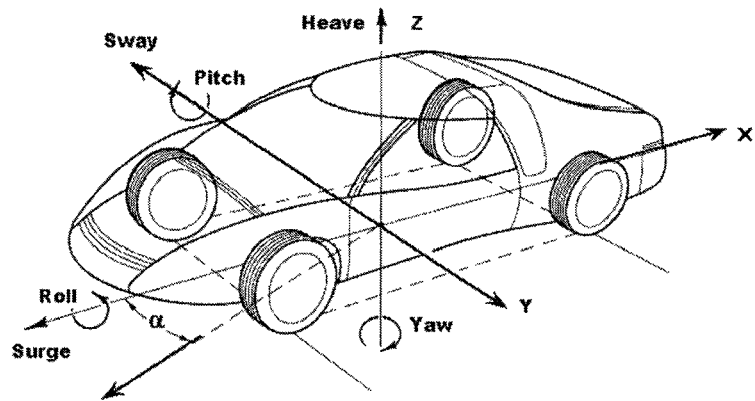
FIG. 1 shows schematically a perspective view of a motor vehicle indicating the six degrees of freedom of the vehicle.

FIG. 1 discloses the dynamics of a motor vehicle in six degrees of freedom denominated as follows:
Motion up and down=Heave;
Motion left and right=Sway;
Motion fore and aft=Surge;
Angular change around a horizontal lateral direction Y=Pitch;
Angular change around a vertical direction Z=Yaw; and
Angular change around a horizontal longitudinal direction X=Roll.

Figure 2:
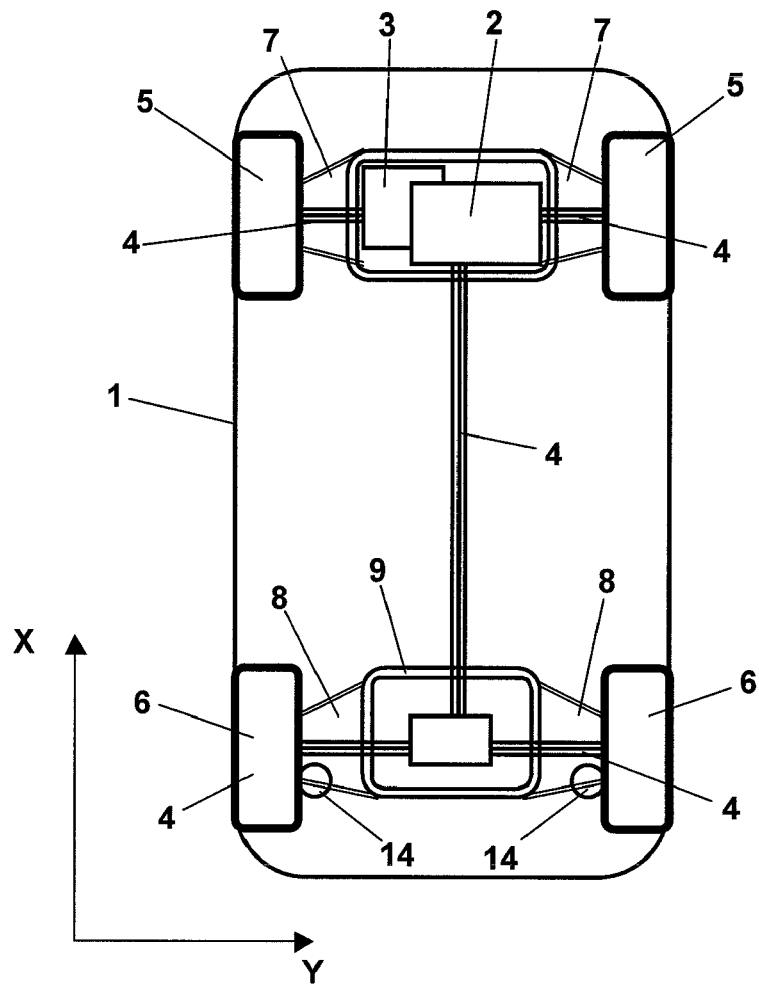
FIG. 2 shows schematically view from above of a motor vehicle having rear wheel suspension according to the invention.

FIG. 2 discloses a motor vehicle comprising a vehicle body 1 and an engine-transmission assembly, comprising an engine 2 and a transmission 3. The engine 2 is provided at the front of the motor vehicle. The transmission 3 comprises drive shafts 4. The motor vehicle has four tire-wheel assemblies, two front tire-wheel assemblies, each having a front wheel 5, and two rear tire-wheel assemblies, each having a rear wheel 6. The drive shafts 4 connect the transmission 3 to the wheels 5, 6 with different driving configurations such as front-, rear- or all wheel drive of the motor vehicle. The motor vehicle comprises a wheel suspension assembly for each wheel, i.e. two front wheel suspension assemblies 7 for the suspension of the front wheels 5 and two rear wheel suspension assemblies 8 for suspension of the rear wheels 6.

Figure 3:
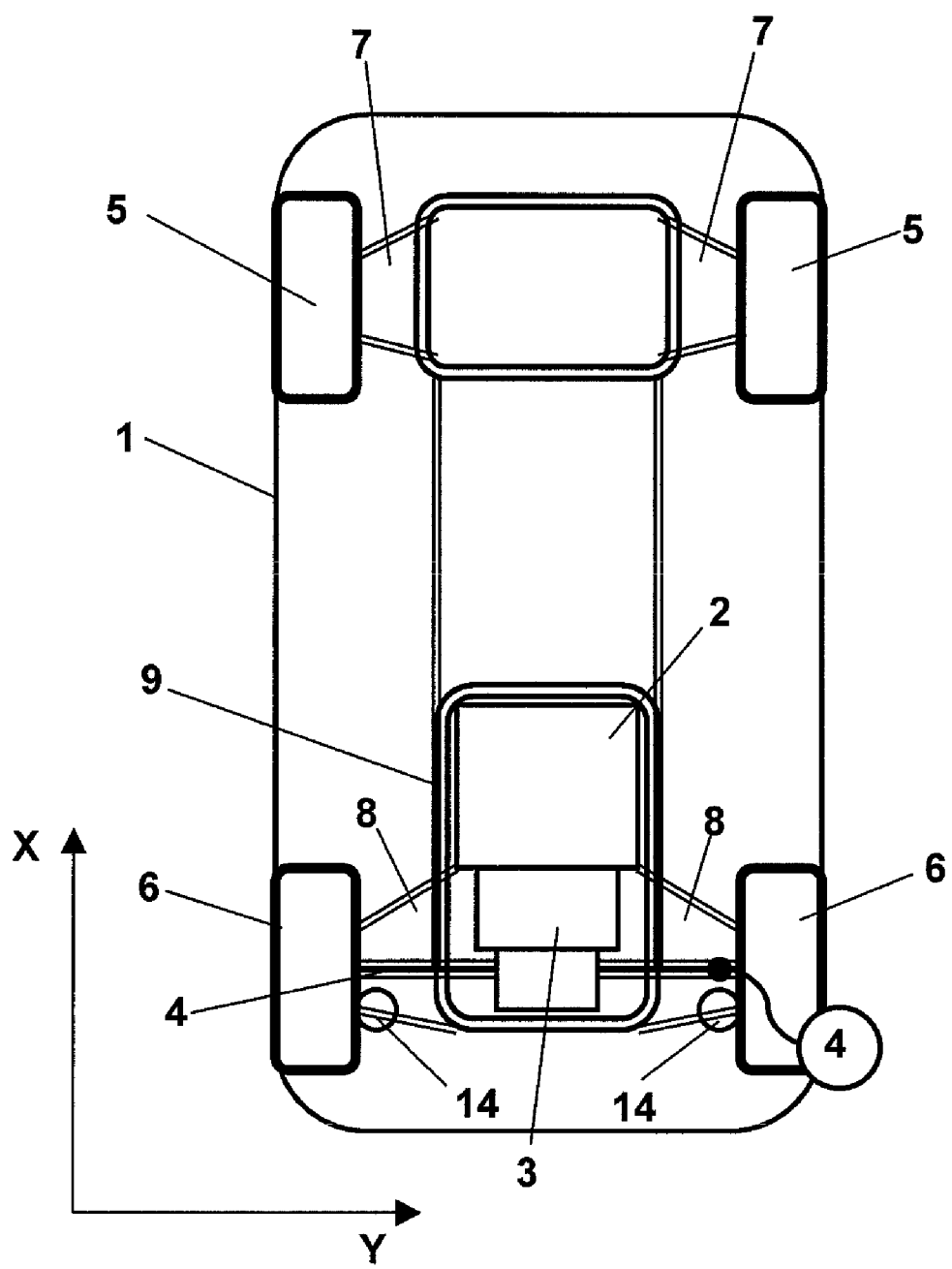
FIG. 3 shows schematically a view from above of another motor vehicle having rear wheel suspension according to the invention.

The motor vehicle also comprises a frame structure 9. In the embodiment disclosed in FIG. 2, the frame structure 9 is directly connected to the vehicle body 1. The embodiment disclosed in FIG. 3 differs from the embodiment disclosed in FIG. 2 in that the frame structure 9 is directly connected to the engine-transmission assembly and in that the engine 3 is provided at a more center position of the motor vehicle forward of the transmission and rear suspension, but rearward of the location of a driver.

The motor vehicle has, in a normal driving state forwardly, a normal driving direction, which coincides with the horizontal longitudinal direction X of the motor vehicle and is perpendicular to the horizontal lateral direction y and to the vertical direction Z.

This invention refers to the wheel suspension assembly 8. Preferred embodiments of the rear wheel suspension assembly 8 are now to be explained with reference to FIGS. 4-6. It is to be noted that although the embodiments disclosed in the following refer to a motor vehicle with the rear wheels 6 being driven, the rear wheel suspension assembly 8 is also applicable to a motor vehicle with non-driven rear wheels such as a front wheel drive vehicle configuration.

The rear wheel suspension assembly 8 comprises a wheel spindle housing 11, adapted to support a wheel spindle 12 on which the rear wheel 6 is mounted. The wheel spindle 12 is connected to the associated drive shaft 4 at a drive joint center 10. The wheel spindle housing 11 and the wheel spindle 12 define a wheel center, i.e. the center of rotation of the wheel 6. A spring link 13 extends between and connects the frame structure 9 and the wheel spindle housing 11. The spring link 13 carries a vehicle spring 14. The vehicle spring 14 is connected to the spring link 13 at a spring link position 21 which is located rearwards the wheel spindle 12 to be supported by the wheel spindle housing 11 along the longitudinal direction X with respect to the normal driving direction. The spring link 13 is connected to the wheel spindle housing 11 by means of a spring link housing joint at a spring link housing position 33 and to the frame structure 9 by means of a spring link frame joint at a spring link frame position 23. The spring link housing position 33 and the spring link frame position 23 both are located below the wheel center with respect to the vertical direction Z, see FIG. 5.

The rear wheel suspension assembly 8 also comprises a shock absorber 15, which is attached to the wheel spindle housing 11 via a shock absorber attachment 35. The shock absorber attachment 35 is provided at a position, which is located at a distance from the vehicle spring 14 and forwards the wheel spindle 12. The shock absorber attachment 35 is supported by the wheel spindle housing 11 along the longitudinal direction X with respect to the normal driving direction.

The rear wheel suspension assembly 8 also comprises a first control link 16, forming a so-called trailing link, and a second control link 17, forming a so-called toe link. The control links 16, 17 extend between and connect the frame structure 9 and the wheel spindle housing 11. The first control link 16 and the second control link 17 are operable to control the wheel spindle housing 11 to maintain the rear wheel 6 substantially in parallel with the longitudinal direction X. Both the first control link 16 and the second control link 17 extend below the wheel spindle 12 with respect to the vertical direction Z, see FIG. 5.

More specifically, the first control link 16 is operable to provide a super-ordinate function of controlling the motion of the wheel center in the longitudinal direction X, and a sub-ordinate function of controlling the wheel spindle housing 11 in such a manner that the rear wheel 6 is substantially parallel with the longitudinal direction X. The second control link 17 is operable to provide a super-ordinate function of controlling the wheel spindle housing 11 in such a manner that the rear wheel 6 is substantially parallel with the longitudinal direction X.

The first control link 16 is connected to the frame structure 9 by means of a first control link frame joint at a first control link frame position 26, and the second control link 17 is connected to the frame structure 9 by means of a second control link frame joint at a second control link frame position 27. The first control link 16 is connected to the wheel spindle housing 11 by means of a first control link housing joint at a first control link housing position 36, and the second control link 17 is connected to the wheel spindle housing 11 by means of a second control link housing joint at a second control link housing position 37. Both the first control link frame position 26 and the second control link frame position 27 are located forwards the wheel center and the wheel spindle 12, see FIG. 4. Furthermore, both the first control link housing position 36 and the second control link housing position 37 are located below the wheel center with respect to the vertical direction Z, see FIG. 5.

Figure 4:
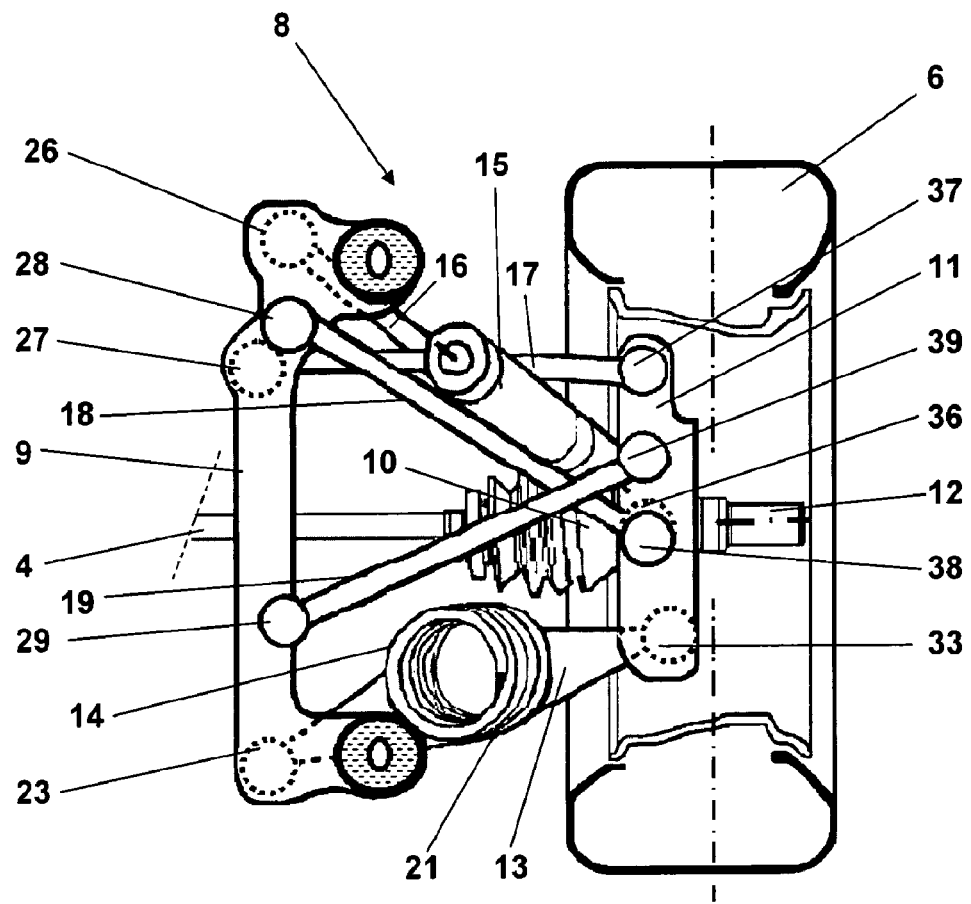
FIG. 4 shows a view from above of a rear wheel assembly according to a first embodiment.

It should be noted that the first control link housing position 36, according to an alternative embodiment, could be located more rearwards than disclosed in FIG. 4. For instance, the first control link 16 could extend to a first control link housing position straight beneath or substantially straight beneath the wheel center and the drive joint center 10.

Figure 5:
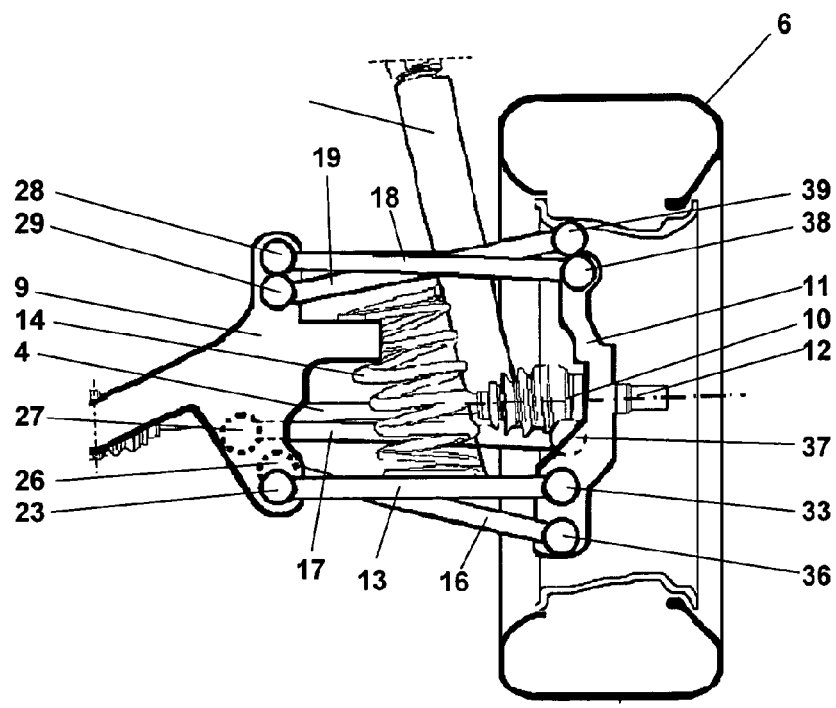
FIG. 5 shows a rear view of the rear wheel assembly in FIG. 4.
Figure 6:
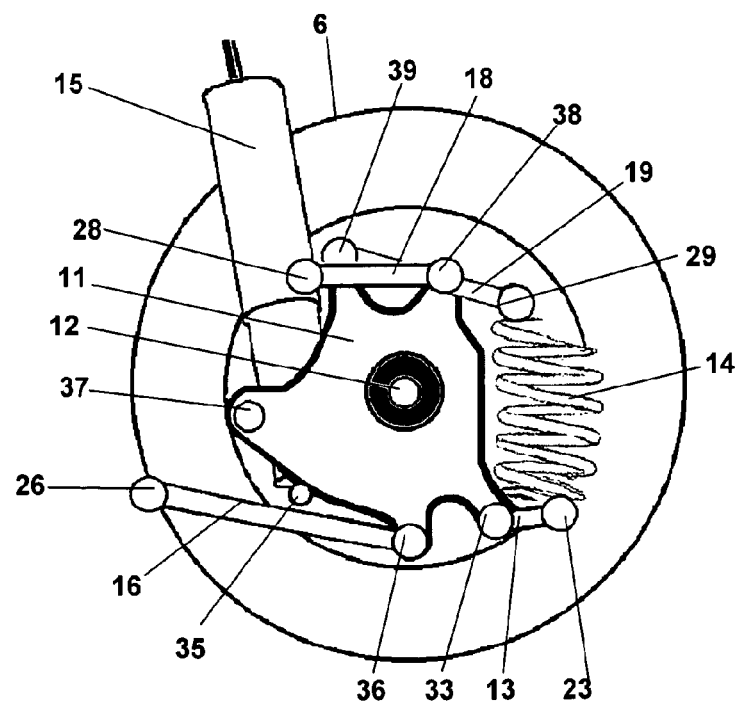
FIG. 6 shows a side view of the rear wheel assembly in FIG. 4.

However, as disclosed in FIGS. 4-6, the first control link frame position 26 is located at a more forward position than the second control link frame position 27 along the longitudinal direction X with respect to the normal driving direction, whereas the first control link housing position 36 is located at a more rearward position than the second control link housing position 37 along the longitudinal direction X. This means that the first control link 16 and the second control link 17 will intersect each other seen in the vertical direction Z, as can be seen in FIG. 4.

Furthermore, the rear wheel suspension assembly 8 comprises a first camber link 18 extending between and connecting the frame structure 9 and the wheel spindle housing 11, and a second camber link 19 extending between and connecting the frame structure 9 and the wheel spindle housing 11.

The first camber link 18 is connected to the frame structure 9 by means of a first camber frame joint at a first camber frame position 28, and the second camber link 19 is connected to the frame structure 9 by means of a second camber frame joint at a second camber frame position 29. The first camber link 18 is connected to the wheel spindle housing 11 by means of a first camber housing joint at a first camber housing position 38, and the second camber link 19 is connected to the wheel spindle housing 11 by means of a second camber housing joint at a second camber housing position 39.

The first camber frame position 28 is located at a more forward position than the second camber frame position 29 along the longitudinal direction X with respect to the normal driving direction. The first camber housing position 38 is located at a more rearward position than the second camber housing position 39 along the longitudinal direction X with respect to the normal driving direction. Consequently, the first camber link 18 and the second camber link 19 intersect each other seen in the vertical direction Z, see FIG. 4.

Moreover, the first camber frame position 28 is located at a higher position than the second camber frame position 29 along the vertical direction Z, and the first camber housing position 38 is located at a lower position than the second camber housing position 39 along the vertical direction Z. Consequently, the first camber link 18 and the second camber link 19 also intersect each other seen in the longitudinal direction X, see FIG. 4.

The first camber housing position 38 and the second camber housing position 39 both are located above the wheel center and the wheel spindle 12 with the respect to the vertical direction Z. More specifically, the first camber link 18 and the second camber link 19 are both located above the wheel spindle 12 with respect to the vertical direction Z.

Figure 10:
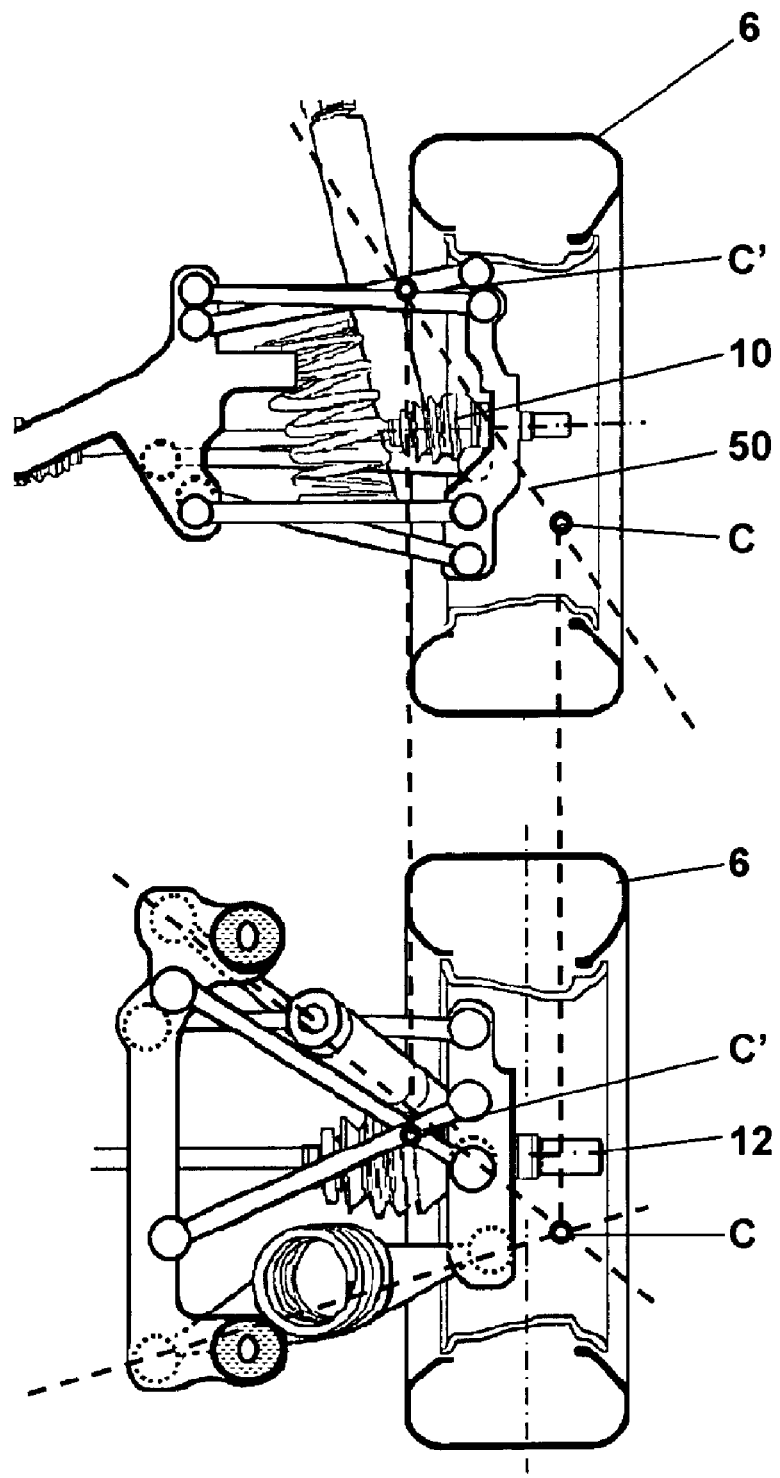
FIG. 10 shows a king pin axis in the views of FIGS. 4 and 5.

In FIG. 10, an approximate position of a king pin axis 50 has been indicated. The king pin axis 50 is the instantaneous axis at each moment around which the wheel spindle housing 11 rotates as a result of the motion pattern given by the topology of the five interdependent links 13, 16, 17, 18 and 19. Furthermore the topology of the first and second camber links 18, 19 and the first control link 16 and the spring link 13 together provide a king pin location and a king pin inclination from the freedom of choice of the virtual instantaneous centers C and C', see FIGS. 7, 8 and 10 such that the king pin axis 50 around which the longitudinal propelling moments and forces from the drive joint center 10 as well as from the propelling forces in the tire contact patch provides desired action defined scientifically as "destructive interference" so as to control, the wheel spindle housing 11 in such a manner that the tire-wheel assembly is substantially parallel with the longitudinal direction X when propelling moments and forces are applied.

The first control link 16 defines a longitudinal axis extending through the control link frame position 26 and the control link housing position 36. The spring link 13 defines a longitudinal axis extending through the spring link frame position 23 and the spring link housing position 33. These two axes meet in a common virtual lower point C as seen in the vertical direction, see FIG. 7.

Figure 8:
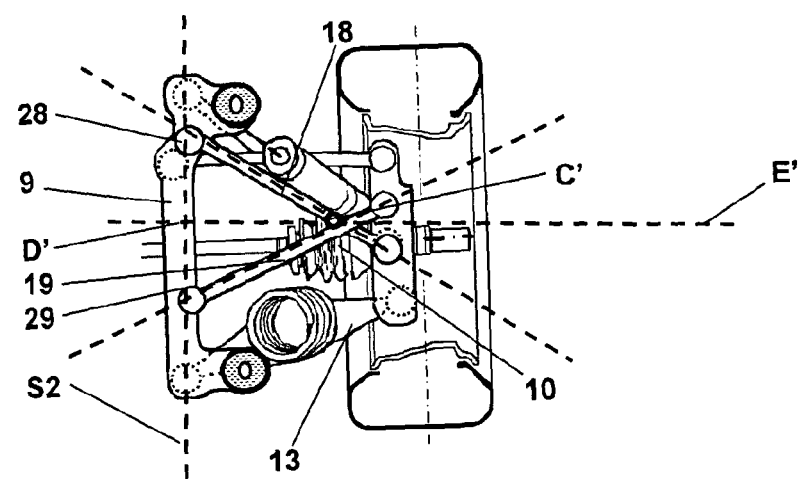

The first control link 16 and the spring link 13 thus together form a virtual lower triangular link at a lower part of the spindle housing 11. The movement of the virtual lower point C is determined by a lower swing axis S1 of the lower triangular link, see FIG. 8, given by the first control link frame position 26 of the first control link frame joint, and by the spring link frame position 23 of the spring link frame joint. For an infinitesimally small movement, the direction of this movement may be determined by any point along a first line E extending perpendicularly from a point D on the lower swing axis S1 and through the lower point C.

The first camber link 18 defines a longitudinal axis extending through the camber link frame position 28 and the camber link housing position 38. The second camber link 19 defines a longitudinal axis extending the camber frame link position 29 and the camber link housing position 39.

These two axes meet in a common virtual upper point C', as seen in the vertical direction, see FIG. 8. The first camber link 18 and the second camber link 19 thus together form a virtual upper triangular link at an upper part of the spindle housing 11. The movement of the virtual upper point C' is determined by an upper swing axis S2 of the virtual upper triangular link, see FIG. 4, given by the first camber frame position 28 of the first camber frame joint, and by the second camber frame position 29 of the second camber frame joint. For an infinitesimally small movement, the direction of this movement may be determined by any point along a second line E' extending perpendicularly from a point D' on the upper swing axis S2 and through the upper point C'.

As can be seen in FIGS. 4 and 7-9, the upper swing axis S1 and the lower swing axis S2 are approximately parallel, or parallel, with each other, at least when seen in the vertical direction z.

Figure 9:
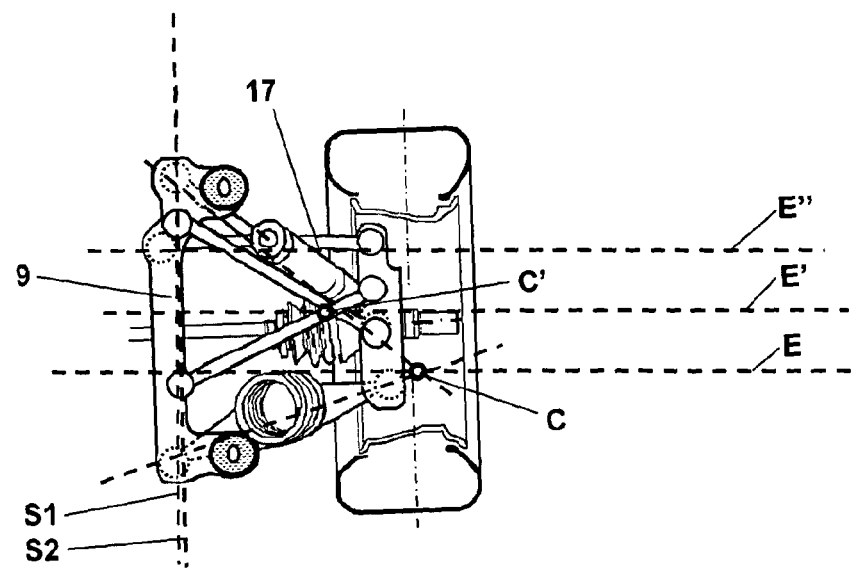

The second control link 17 defines a third line E" swingably journalled in the frame structure 9, see FIG. 9.

The instantaneous center of motion of the wheel spindle housing to which the wheel and the tire is attached over the bearing and the wheel spindle is obtained where the first line E, the second line E' and the third line E" cross each other seen in the vertical direction, which is perpendicular to the road and thus the tire to road contact patch.

Since the lower swing axis S1 and the upper swing axis S2 are approximately parallel, with a very small inclination from the longitudinal direction X, the instantaneous center of motion will be located at a position far outside the wheel 6 and then in the rear of the wheel spindle, as indicated by the lines E and E', or at a position far inside the wheel 6 and then in front of the wheel spindle.

As mentioned, the lower swing axis S1 and the upper swing axis S2 may have a very small inclination from the longitudinal direction X or may be approximately parallel or parallel with the longitudinal direction X.

Figure 7:
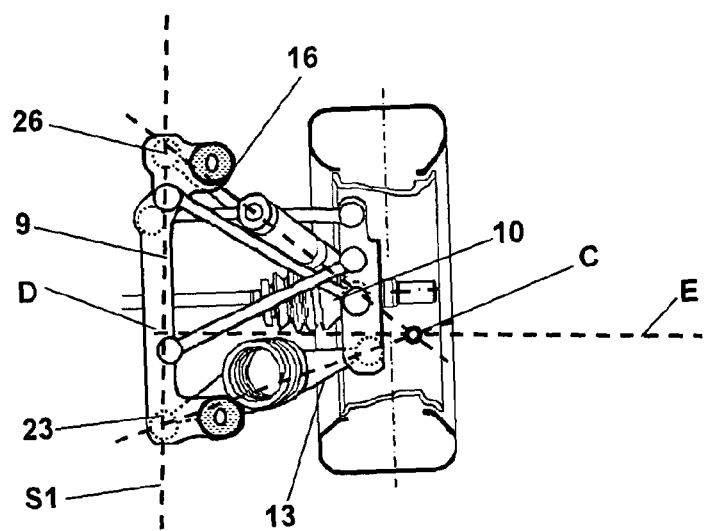
FIGS. 7-9 show views from above of the rear wheel assembly in FIG. 1.

As can be seen in the FIGS. 7-9, the instantaneous center of motion is located at a distance from the drive joint center 10 that is significantly longer than the lateral distance between the drive joint center 10 and the frame structure 9 along a lateral direction Y being perpendicular to the vertical direction Z and the longitudinal direction X and wherein.

Since the second control link 17 defines the third line E" swingably journalled in the frame structure 9 as can be seen in the FIGS. 7-9, the instantaneous center of motion of the wheel housing and by the in the wheel plane rotating wheel and tire will coincide at a great distance from the wheel making possible to synchronize motion as defined by the topology as defined by the suspension in contact with the frame with the motion of the wheel and tire rotation around the wheel spindle where the tire is in contact with the road such that the desired maximization of structural bonding from a homogeneous distribution of the stresses is accomplished.

The present invention is not limited to the embodiments disclosed hut may be varied and modified within the scope of the following claims. For instance, the first control link frame position 26 may as an alternative be located at a more rearward position than the second control link frame position 27 along the longitudinal direction X with respect to the normal driving direction, and the first control link housing position 36 may be located at a more rearward position than the second control link housing position 37 along the longitudinal direction X. This means that the first control link 16 and the second control link 17 are arranged not to intersect each other seen in the vertical direction Z. In this case, the control links 16 and 17 can be but do not have to be parallel with each other.

The invention claimed is:

1. A wheel suspension assembly adapted for the suspension of a rear wheel of a motor vehicle having a vehicle body and an engine-transmission assembly, the assembly defining a longitudinal direction adapted to be parallel with the normal driving direction of the motor vehicle and a vertical direction being perpendicular to the longitudinal direction (X) and adapted to be vertical when the motor vehicle is in a normal driving state, the suspension assembly comprising:
   a wheel spindle housing, adapted to support a wheel spindle on which the rear wheel is mountable and defining a wheel center,
   a frame structure adapted to be connected to the vehicle body or the engine-transmission assembly,
   a spring link extending between and connecting the frame structure and the wheel spindle housing, the spring link carrying a vehicle spring,
   a first control link and a second control link extending between and connecting the frame structure and the wheel spindle housing, wherein the first and second control links are operable to control the wheel spindle housing to maintain the rear wheel substantially in parallel with the longitudinal direction,
   a first camber link extending between and connecting the frame structure and the wheel spindle housing, and
   a second camber link extending between and connecting the frame structure and the wheel spindle housing,
   wherein the first camber link and the second camber link intersect each other seen in the vertical direction,
   wherein the spring link, the first and second control links and the first and second camber links have a topology defining an instantaneous center of motion,
   wherein the instantaneous center of motion is located at a position far outside the wheel and then in the rear of the wheel spindle, or far inside the wheel and then in front of the wheel spindle, and
   wherein the first control link and the spring link together form a virtual lower triangular link swingable about a lower swing axis, wherein the first camber link and the second camber link together form a virtual upper triangular link swingable about an upper swing axis, wherein the lower swing axis and the upper swing axis are approximately parallel with each other.

2. The wheel suspension assembly according to claim 1, wherein a drive joint center of the rear wheel is located at a lateral distance from the frame structure along a lateral direction being perpendicular to the vertical direction and the longitudinal direction and wherein the instantaneous center of motion is located at a distance from the drive joint center that is significantly longer than said lateral distance.

3. The wheel suspension assembly according to claim 2, wherein the topology of the first and second camber links and the first control link and the spring link together provide a king pin axis having a king pin location and a king pin inclination relative to the drive joint center so as to provide an action of controlling the wheel spindle housing in such a manner that the tire-wheel assembly is substantially parallel with the longitudinal direction when propelling moments and forces are applied.

4. The wheel suspension assembly according to claim 1, wherein the first camber link and the second camber link intersect each other seen in the longitudinal direction.

5. The wheel suspension assembly according to claim 1, wherein the first camber link is connected to the frame structure at a first camber frame position and the second camber link is connected to the frame structure at a second camber frame position, and wherein the first camber frame position is located at a more forward position than the second camber frame position along the longitudinal direction with respect to the normal driving direction.

6. The wheel suspension assembly according to claim 5, wherein the first camber frame position is located at a higher position than the second camber frame position along the vertical direction.

7. The wheel suspension assembly according to claim 1, wherein the first camber link is connected to the wheel spindle housing at a first camber housing position and the second camber link is connected to the wheel spindle housing at a second camber housing position, and wherein the first camber housing position and the second camber housing position both are located above the wheel center with the respect to the vertical direction.

8. The wheel suspension assembly according to claim 1, wherein the first camber link and the second camber link both are located above the wheel spindle with respect to the vertical direction.

9. The wheel suspension assembly according to claim 1, wherein the vehicle spring is connected to the spring link at a spring link position which is located rearwards the wheel spindle to be supported by the wheel spindle housing along the longitudinal direction with respect to the normal driving direction.

10. The wheel suspension assembly according to claim 1, further comprising:
   a shock absorber which is attached to the wheel spindle housing via a shock absorber attachment.

11. The wheel suspension assembly according to claim 10, wherein the shock absorber attachment is provided at a position which is located at a distance from the vehicle spring and forwards the wheel spindle to be supported by the wheel spindle housing along the longitudinal direction with respect to the normal driving direction.

12. The wheel suspension assembly according to claim 1, wherein the first control link is operable to provide
   a super-ordinate function of controlling the motion of the wheel center in the longitudinal direction being perpendicular to a lateral direction and the vertical direction, and
   a sub-ordinate function of controlling the wheel spindle housing in such a manner that the rear wheel is substantially parallel with the longitudinal direction.

13. The wheel suspension assembly according to claim 1, wherein the second control link is operable to provide a super-ordinate function of controlling the wheel spindle housing in such a manner that the rear wheel is substantially parallel with the longitudinal direction.

14. The wheel suspension assembly according to claim 1, wherein the first control link and the second control link intersect each other seen in the vertical direction.

15. The wheel suspension assembly according to claim 1, wherein the first control link and the second control link both extend below the wheel spindle with respect to the vertical direction.

16. The wheel suspension assembly according to claim 1, wherein the first control link is connected to the frame structure at a first control link frame position and the second control link is connected to the frame structure at a second control link frame position, and wherein the first control link is connected to the wheel spindle housing at a first control link housing position and the second control link is connected to the wheel spindle housing at a second control link housing position.

17. The wheel suspension assembly according to claim 16, wherein the first control link frame position and the second control link frame position are located forwards the wheel center.

18. The wheel suspension assembly according claim 16, wherein the first control link housing position and the second control link housing position both are located below the wheel center with respect to the vertical direction.

19. The wheel suspension assembly according to claim 16, wherein the first control link frame position is located at a more forward position than the second control link frame position along the longitudinal direction with respect to the normal driving direction and wherein the first control link housing position is located at a more rearward position than the second control link housing position along the longitudinal direction.

20. The wheel suspension assembly according claim 16, wherein the first control link housing position and the second control link housing position both are located forwards the wheel center with respect to the longitudinal direction.

21. A motor vehicle comprising a vehicle body, an engine-transmission assembly and a wheel suspension assembly adapted for the suspension of a rear wheel of the motor vehicle, the assembly defining a longitudinal direction adapted to be parallel with the normal driving direction of the motor vehicle and a vertical direction being perpendicular to the longitudinal direction and adapted to be vertical when the motor vehicle is in a normal driving state, the suspension assembly comprising;
 a wheel spindle housing adapted to support a wheel spindle on which the rear wheel is mountable and defines a wheel spindle axis,
 a frame structure adapted to be connected to the vehicle body or the engine-transmission assembly,
 a spring link extending between and connecting the frame structure and the wheel spindle housing, the spring link carrying a vehicle spring,
 a first control link and a second control link extending between and connecting the frame structure and the wheel spindle housing, wherein the first and second control links are operable to control the wheel spindle housing to maintain the rear wheel substantially in parallel with the longitudinal direction,
 a first camber link extending between and connecting the frame structure and the wheel spindle housing, and
 a second camber link extending between and connecting the frame structure and the wheel spindle housing,
 wherein the first camber link and the second camber link intersect each other seen in the vertical direction, and
 wherein the spring link, the first and second control links and the first and second camber links have a topology defining an instantaneous center of motion,
 wherein the instantaneous center of motion is located at a position far outside the wheel and then in the rear of the wheel spindle, or far inside the wheel and then in front of the wheel spindle, and
 wherein the first control link and the spring link together form a virtual lower triangular link swingable about a lower swing axis, and
 wherein the first camber link and the second camber link together form a virtual upper triangular link swingable about an upper swing axis, wherein the lower swing axis and the upper swing axis are approximately parallel with each other.

22. A motor vehicle, comprising:
 a vehicle body,
 an engine-transmission assembly and
 a wheel suspension assembly adapted for the suspension of a rear wheel of the motor vehicle, the assembly defining a longitudinal direction adapted to be parallel with the normal driving direction of the motor vehicle and a vertical direction being perpendicular to the longitudinal direction and adapted to be vertical when the motor vehicle is in a normal driving state, the suspension assembly comprising
  a wheel spindle housing adapted to support a wheel spindle on which the rear wheel is mountable and defines a wheel spindle axis,
  a frame structure adapted to be connected to the vehicle body or the engine-transmission assembly,
  a spring link extending between and connecting the frame structure and the wheel spindle housing, the spring link carrying a vehicle spring,
  a first control link and a second control link extending between and connecting the frame structure and the wheel spindle housing, wherein the first and second control links are operable to control the wheel spindle housing to maintain the rear wheel substantially in parallel with the longitudinal direction,
  a first camber link extending between and connecting the frame structure and the wheel spindle housing, and
  a second camber link extending between and connecting the frame structure and the wheel spindle housing,
  wherein the first camber link and the second camber link intersect each other seen in the vertical direction, and
  wherein the spring link, the first and second control links and the first and second camber links have a topology defining an instantaneous center of motion,
  wherein the instantaneous center of motion is located at a position far outside the wheel and then in the rear of the wheel spindle, or far inside the wheel and then in front of the wheel spindle,
  wherein the first control link and the spring link together form a virtual lower triangular link swingable about a lower swing axis,
  wherein the first camber link and the second camber link together form a virtual upper triangular link swingable about an upper swing axis, and
  wherein the lower swing axis and the upper swing axis are approximately parallel with each other.

* * * * *